(12) United States Patent
Clausen

(10) Patent No.: US 7,852,869 B2
(45) Date of Patent: Dec. 14, 2010

(54) METHOD AND APPARATUS FOR THE TRANSMISSION OF DATA

(75) Inventor: Axel Clausen, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 1561 days.

(21) Appl. No.: 11/141,980

(22) Filed: May 31, 2005

(65) Prior Publication Data

US 2005/0286403 A1 Dec. 29, 2005

(30) Foreign Application Priority Data

May 28, 2004 (DE) ............... 10 2004 026 214

(51) Int. Cl.
*H04B 7/216* (2006.01)
*H04B 7/212* (2006.01)
*H04J 4/00* (2006.01)
*H04L 12/54* (2006.01)

(52) U.S. Cl. ............ 370/441; 370/442; 370/436; 370/329

(58) Field of Classification Search ......... 370/208–210, 370/264, 265, 203–205, 395.2–395.21, 419–420, 370/463; 375/219, 222
See application file for complete search history.

(56) References Cited

U.S. PATENT DOCUMENTS

| 6,201,830 | B1 | 3/2001 | Chellali et al. |
| 6,219,377 | B1 | 4/2001 | Linz |
| 6,542,460 | B1* | 4/2003 | Ring ........................ 370/203 |
| 6,721,355 | B1 | 4/2004 | McClennon |
| 7,010,027 | B1* | 3/2006 | Mestdagh et al. ......... 375/222 |
| 7,356,049 | B1* | 4/2008 | Rezvani .................... 370/484 |
| 7,369,566 | B2* | 5/2008 | Deczky .................... 370/430 |
| 7,580,630 | B2* | 8/2009 | Kee et al. .................... 398/25 |
| 2005/0169392 | A1* | 8/2005 | Redfern .................... 375/260 |
| 2005/0195907 | A1* | 9/2005 | Jain .......................... 375/260 |
| 2005/0201474 | A1* | 9/2005 | Cho et al. ................. 375/260 |
| 2005/0271387 | A1* | 12/2005 | Kee et al. ................... 398/140 |

FOREIGN PATENT DOCUMENTS

| EP | 1 011 206 A2 | 6/2000 |
| JP | 11308356 A | 11/1999 |
| WO | WO 03/041367 A2 | 5/2003 |

* cited by examiner

*Primary Examiner*—Thai D Hoang
(74) *Attorney, Agent, or Firm*—Eschweiler & Associates, LLC

(57) ABSTRACT

A method and an apparatus for the transmission of data is provided, wherein the data, in a first operating mode, are transmitted in a plurality of first frequency bands and, in a second operating mode, are transmitted in a plurality of second frequency bands. A number of the first frequency bands is in this case greater than a number of the second frequency bands. The first operating mode is used if there is a large quantity of data to be transmitted. If only a small quantity of data is to be transmitted, switchover to the second operating mode is effected, whereby a power saving can be achieved, particularly in digital parts of a transmitting device and of a receiving device.

33 Claims, 2 Drawing Sheets

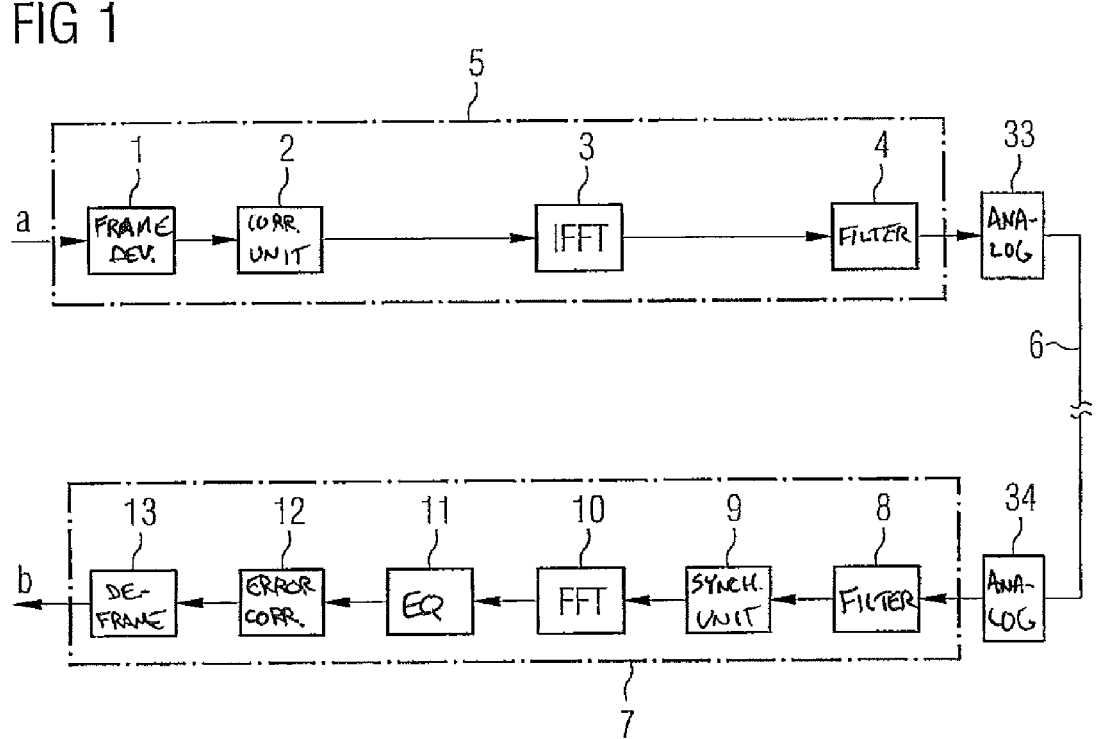

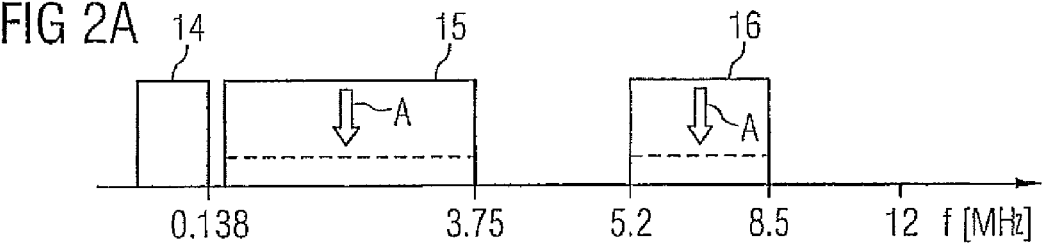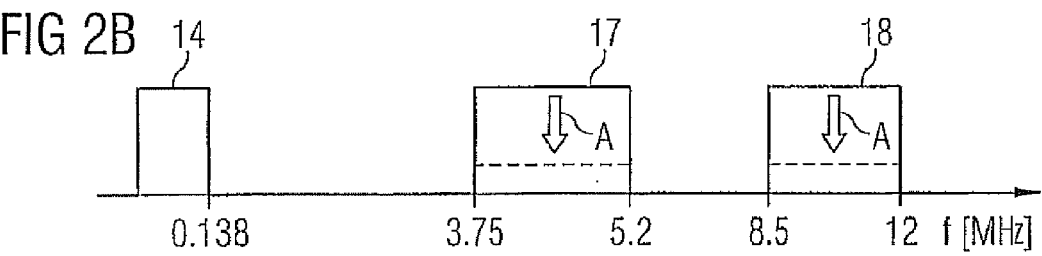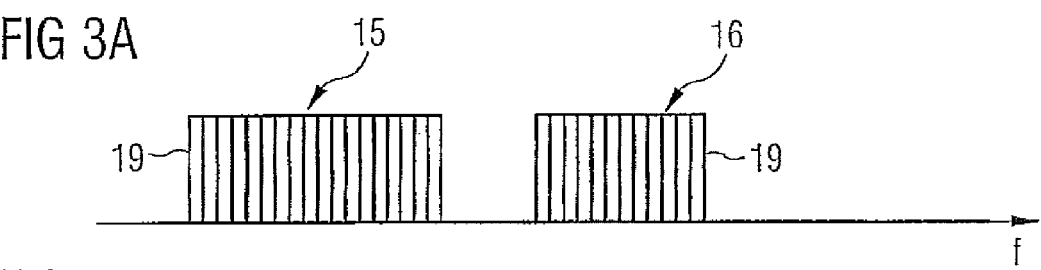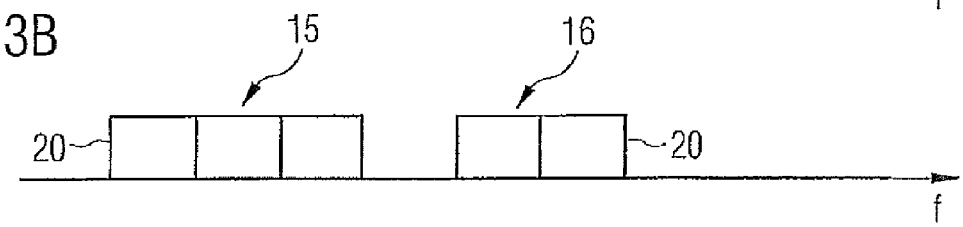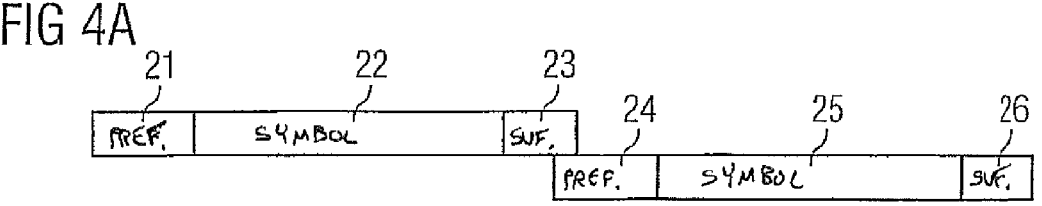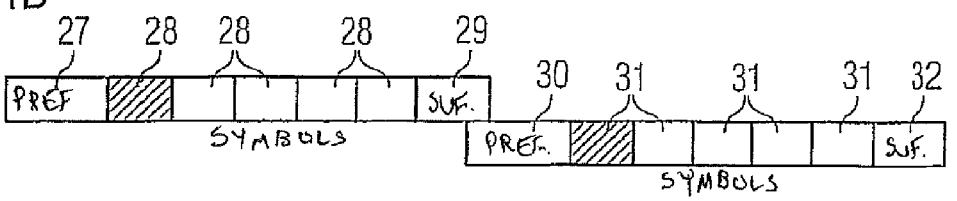

METHOD AND APPARATUS FOR THE TRANSMISSION OF DATA

FIELD OF THE INVENTION

The present invention relates to a method and an apparatus for the transmission of data, in particular, for the transmission of DSL ("Digital Subscriber Line") data such as VDSL ("Very High Bit Rate Digital Subscriber Line") data.

BACKGROUND

With the increasing spread of the Internet, for both commercial and private users, the number of installed DSL lines is also increasing. Consequently, power consumption, in both the lines and in corresponding transmitting and receiving units, is becoming ever greater. In switching centres, in particular, in which many such DSL lines converge, heat build-up and power consumption are so great that there is a need for energy-saving options.

The so-called ADSL2 ("Asymmetric Digital Subscriber Line") Standard defined a so-called "low-power mode", i.e., an energy-saving transmission mode. This mode is used when it is detected that only relatively small amounts of data have to be transmitted. In this case, a number of possible constellations, i.e., possible phase angles in the case of use of a discrete multitone modulation on different carrier frequencies, is reduced, and only those constellations which require a relatively small signal-to-noise ratio are used. It is thereby possible to reduce an output power of an employed line driver and thus save energy.

Such a principle is also applicable to DSL systems other than ADSL, for example, to VDSL systems. In this case, the described method has the disadvantage that only the power consumption for the transmission, i.e., in an analog part, but not the power consumption in digital circuit sections or digital parts of a corresponding transmitting or receiving device, is reduced. Due to the substantially higher data rates in VDSL systems, however, the power consumption in this case is substantially higher in the digital parts than in the case of ADSL systems. Moreover, in principle VDSL systems have a lesser output power than ADSL systems, so that, for this reason also, the power consumption is relatively greater in the digital parts than in the case of ADSL systems.

SUMMARY

It is therefore an object of the invention to provide both a method and an apparatus for the transmission of data, by means of which power consumption is reduced, including, in particular, in a digital part of a transmitting or receiving device.

This object is achieved by, respectively, a method and an apparatus according embodiments of the invention.

According to the invention, there is proposed a method for the transmission of data wherein the data, in a first operating mode, is transmitted in a plurality of first frequency bands or carriers, and the data, in a second operating mode, is transmitted in a plurality of second frequency bands or carriers, the number of the first frequency bands being greater than the number of the second frequency bands. In dependence on a quantity of data to be transmitted, switchover is effected between the first operating mode and the second operating mode, the first operating mode being used, in particular, in the case of a greater quantity of data to be transmitted, and the second operating mode being used in the case of a lesser quantity of data to be transmitted. The switchover between the operating modes can be effected, for example, in dependence on one or more threshold values.

Due to the reduction of the number of frequency bands from the first number to the second number, it is possible to reduce the power necessary for transmission.

Data symbols are preferably transmitted repeatedly in the second operating mode. This renders possible a further reduction of the transmission power, since a greater noise caused by lesser power can be averaged out by averaging of repeatedly transmitted data symbols.

In addition, in this case a device for inverse Fourier transformation (IFFT) in a corresponding transmitting device can be of such design that it performs the required calculations only once and, for the repetitions, makes use of the already performed calculations. Inversely, a Fourier transformation (FFT) also only needs to be performed once in a corresponding receiving device, preferably following averaging of the received, repeatedly transmitted data symbols. Since devices for Fourier transformation and inverse Fourier transformation are those components which in digital parts of, for example, VDSL, require the greatest power, this measure can be used to substantially reduce power consumption of a digital part of a transmitting or receiving device.

The second number can be less, by a factor N, than the first number, each data symbol being transmitted N times in this case. This reduction of the number can be effected in that in each case a number, for example N, of frequency bands of the first number of frequency bands is combined to form a single frequency band of the second number of frequency bands. N frequency bands of the first frequency bands can also be grouped together in each case and, for the second number of frequency bands, respectively one frequency band of each group can be selected, which frequency band can change from one data symbol to another, in order to render possible a more uniform frequency distribution and, consequently, a flatter spectrum. This can be effected, for example, by shifting a respectively used frequency band by one frequency band in the frequency range.

BRIEF DESCRIPTION OF THE DRAWING

The invention is explained more fully in the following with reference to a preferred exemplary embodiment and the appended drawing, wherein;

FIG. 1 shows a block diagram of an apparatus, according to the invention, for executing the method according to the invention, FIGS. 2A and 2B show frequency ranges for a VDSL data transmission, wherein FIG. 2A represents frequency ranges for a downstream transmission and FIG. 2B represents frequency ranges for an upstream transmission, FIGS. 3A and 3B show the division of the frequency ranges of FIG. 2A in a normal operating mode (FIG. 3A) and in a low-power mode according to the invention (FIG. 3B), and FIGS. 4A and 4B show sequences of transmitted data symbols, wherein FIG. 4A shows sequences in the normal operating mode of FIG. 3A and FIG. 4B shows sequences in the low-power mode of FIG. 3B.

DETAILED DESCRIPTION

Represented schematically in FIG. 1 is a VDSL system which is designed for executing a method, according to the invention, for transmitting data. In this case, a data sequence a to be transmitted is supplied to a so-called framing device 1 of a digital part 5 of a transmitting device. The framing device 1 divides an incoming transmission data stream a into so-called frames, each of which comprises a defined number of data units. The individual data units, each of which may comprise a plurality of bits, are modulated, for example by means of discrete multitone modulation, on various available carrier frequencies. In addition, a correction unit 2 can be provided to perform an error correction, for example by means of coding. The process performed by the correction unit 2 may also be termed forward error correction (FEC). By means of a first transforming device 3, an inverse fast Fourier transformation is applied to the frames, a sequence of chronologically successive data for transmission being obtained from the data modulated in parallel on different carrier frequencies. This sequence is filtered in a transmission filter 4 in order to suppress any interference. The digital transmission signal produced thus in the digital part 5 of the transmission device is supplied to a transmission-side analog part 33, in which a digital-to-analog conversion and amplification are performed by a line driver in order to transmit the signal via a transmission link 6.

In a receiving device, the signal transmitted thus via the transmission link 6 is first processed by a receiving-side analog part 34 in which, inter alia, different filtering operations and an analog-to-digital conversion are performed in order to transfer the received signal to a digital part 7 of the receiving device. Here, the signal is filtered by a digital receiving filter 8 and synchronized in a unit 9. If necessary, time-domain equalization is also performed in the unit 9.

A second transforming device 10 is used to perform a fast Fourier transformation (FFT) in order to transform the signal, available as a chronological sequence of data, into frequency representation, in particular, in order to recover the individual carrier frequencies. An equalizer 11 performs an equalization in frequency representation, this being followed by a device 12 for correcting transmission errors. In a so-called deframing unit 13, the data transmitted via the individual carrier frequencies are demodulated and output as a received data stream b which, if the transmission is free from errors, corresponds to the transmission data stream a.

Consideration of a number of multiplications required in the digital parts 5 and 7 shows that the first transforming device 3 and the second transforming device 10 are those units in which the computing requirement, and consequently the power consumption, is greatest. In order to achieve a power saving in the case of a low data rate of the input data stream a or a small quantity of data to be transmitted, transmission is therefore effected, as explained in detail in the following, in a low-power mode which is based, essentially, on the fact that a number of carrier frequencies used in the framing unit 1 is reduced. In this connection, it must ensured that the transmitted spectrum be altered as little as possible, since this could affect crosstalk to other systems. According to the invention, this is achieved in that, in particular, the framing unit 1 is of such design that, as explained in detail in the following, a plurality of frequency bands or carriers are combined to form a single frequency band or carrier.

This combining can be effected if the data rate, or the quantity of data to be transmitted, falls below a first threshold. It is reversed if the data rate, or the quantity of data to be transmitted, rises above a second threshold which, in order to prevent an unstable behaviour, can be greater than the first threshold.

In order to explain this more precisely, frequency ranges used in transmission according to the VDSL (Very High Bit Rate Digital Subscriber Line) Standard are represented in FIGS. 2A and 2B. In this case, FIG. 2A shows frequency ranges used in a downstream direction, i.e., from a switching centre to a subscriber line, and FIG. 2B shows frequency ranges used in an upstream direction, i.e., from a subscriber line to a switching centre. As shown in FIG. 2A, the transmission in the downstream direction occurs in a first frequency range 15 of between 0.138 MHz and 3.75 MHz and in a second frequency range 16 of between 5.2 MHz and 8.5 MHz. The reference 14 denotes a further, optional, band, which can be used, for example, for telephone signals or also for the transmission of data.

In the upstream direction, the data transmission occurs in a third frequency range 17, between the first frequency range 15 and the second frequency range 16, and in a fourth frequency range 18 which is above the second frequency range 16 and extends from 8.5 to 12 MHz. Through application of the method according to the invention, the transmission power is reduced as uniformly as possible in the frequency ranges 15 to 18, as indicated by the arrows A.

For the purpose of transmission, the frequency ranges 15 to 18, also termed channels, are resolved into sub-channels or frequency bands which, in the case of the VDSL Standard, each have a width of 43.125 kHz. Each sub-channel then corresponds to an employed carrier frequency. In the framing device 1 from FIG. 1, the data to be transmitted are correspondingly modulated on to these frequency bands by means of discrete multitone modulation (DMT).

Such a sub-division into frequency bands is represented schematically for the downstream direction in FIG. 3A, the frequency ranges 15 and 16 being respectively subdivided into frequency bands 19. The number of frequency bands 19 shown in this case is merely illustrative, and does not correspond to the actually existing number of frequency bands, which is substantially greater.

According to the invention, if only a small amount of data is to be transmitted, in each case N of the frequency bands 19 are now combined to form a single frequency band or carrier 20, as shown in FIG. 3B. In the example represented in FIGS. 3A and 3B, 6 frequency bands 19 are in each case combined to form a single frequency band 20. The data transmission is then effected in such a way that data is only modulated on to a respectively single carrier frequency of each new, combined frequency band 20. This can be effected in such a way, for example, that the corresponding data is modulated from frame to frame alternately on to respectively one of the frequency bands 19 that have been combined to form the respective frequency band 20. This achieves a uniform distribution of the—now reduced—transmission power over the entire frequency range and, consequently a flat spectrum, so that the transmission behaviour and, in particular, crosstalk to other lines is not substantially altered.

As shown in the following, this method according to the invention can be used to reduce a computing requirement, and consequently a power consumption, in the first transforming device 3 for inverse Fourier transformation and in the second transforming device 10 for Fourier transformation from FIG. 1. This is to be explained with reference to FIGS. 4A and 4B. FIG. 4A is a schematic representation of a sequence of so-called symbols which are transmitted. In this case, in FIG. 4A, a first symbol 22 and a second symbol 25 are transmitted. The term symbol in this case is understood to be the data sequence, in the time domain, that is produced from a frame by the first transforming device 3 from FIG. 1. In this case, a portion of the data sequence is usually repeated (so-called cyclic extension), in order to facilitate settling of the receiving device. The number of individual data in the symbol 22 in this case depends on the width of the Fourier transformation or inverse Fourier transformation and, consequently, on the number of frequency bands or carrier frequencies used.

A prefix 21 is transmitted before the first data symbol 22, and a prefix 24 is transmitted before the second data symbol 25. Accordingly, a suffix 23 is transmitted after the first symbol 22 and a suffix 26 is transmitted after the second symbol 25. The prefix and suffix respectively identify the start and end of the transmission of a symbol.

If, as represented in FIGS. 3A and 3B, N frequency bands 19 are now combined to form a single frequency band 20, i.e., fewer carrier frequencies in total are used for a frame, according to that which has been stated above, the number of data in a symbol is also reduced by the factor N. Since, however, the digital-to-analog converter in the analog part 33 operates at a constant sampling rate, this results in the symbol rate being increased by the factor N. This would mean that, during an original symbol duration of the symbol 22, N Fourier transformations and inverse Fourier transformations have to be performed with a width reduced by the factor N, which would not result in any substantial saving in power. Moreover, no substantial alteration of the data rate would result in this case.

According to the invention, however, each symbol is repeated N times, as represented in FIG. 4B. These N repetitions, represented in FIG. 4B as symbols 28 in a first symbol block and as symbols 31 in a second symbol block, are in each case provided with a common prefix 27 and 30 respectively, and a common suffix 29 and 32 respectively. Such a block therefore has the same length as a block consisting of a prefix, symbol and suffix from FIG. 4A.

Of the symbols 28 and 31, only the respectively first symbol is produced by the first transforming device 3 and transformed back into the frequency domain by the second transforming device 10. In FIG. 4B, these first symbols are each shown in grey. For the further symbols 28 and 31, the symbol is only read with corresponding frequency out of a buffer of the first transforming device 3. For the purpose of back-transformation, the calculation in the second transforming device 10 is either performed only with respectively one of the received symbols or—as explained in greater detail below—performed with an averaged symbol obtained through averaging over the repeated symbols. The number of calculations required in the first transforming device 3 and second transforming device 10 is thus reduced by the factor N. The computing requirement in other portions of the digital parts 5 and 7 is reduced accordingly.

In this case, the repetitions of the same symbols result in the carrier bandwidth being reduced by the factor N. Consequently, by virtue of its structure, the transmitted signal corresponds to a signal that has been generated by the original transforming device 3 with an inverse Fourier transformation of the original width, and in which only every Nth carrier contains data information.

This can be exploited in the receiver since, in this case, no new coefficients of the frequency range equalizer 11 need be calculated, since coefficients for the represented low-power mode correspond to coefficients which lie in the middle of the combined carrier frequencies or channels. The original frame structure is also substantially maintained, as shown by FIGS. 4A and 4B. It is only necessary to transmit a signal to the receiver to indicate the symbol from which the low-power mode is started, i.e., from which symbol it is possible to effect the described Fourier transformation with a reduced width and repeated output of the same symbol.

A further power reduction can be effected in that the N same symbols 28 and 31 that are transmitted are averaged in the receiving device. This improves the signal-to-noise ratio (SNR), and an output power of a line driver in the analog part 33 can be reduced accordingly.

For improved adaptation to the quantity of data to be transmitted, the apparatus represented in FIG. 1 can be of such design that the number N of repetitions, or of combined carriers, is determined in dependence on the quantity of data to be transmitted, or switched over between a plurality of low-power modes having different Ns. A lesser quantity of data to be transmitted in this case corresponds to a greater value N.

The described method is applicable not only to VDSL systems which, in this case, have been used merely as an example; rather, it is possible to apply the principle according to the invention to any transmissions in which the transmission is effected on a plurality of frequency bands or carrier frequencies, which can then be combined according to the present invention.

I claim:

1. A method for the transmission of data between a first location and a second location, the method comprising:
    a) transmitting the data in a first operating mode on a plurality of first frequency bands, the plurality of first frequency bands including first downstream frequency bands for transmitting data from the first location to the second location and first upstream frequency bands for transmitting data from the second location to the first location;
    b) transmitting the data in a second operating mode on a plurality of second frequency bands, the plurality of second frequency bands including second downstream frequency bands for transmitting data from the first location to the second location and second upstream frequency bands for transmitting data from the second location to the first location, wherein a number of the plurality of first frequency bands is greater than a number of the plurality of second frequency bands; and
    c) switching between the first operating mode and the second operating mode in dependence on a quantity of data to be transmitted.

2. The method according to claim 1, wherein the second frequency bands are respectively formed by combination of a number of first frequency bands.

3. The method according to claim 2, wherein step b) further comprises transmitting data on the plurality of second frequency bands by modulating data alternatingly onto one of the number of first frequency bands combined to form the plurality of second frequency bands.

4. The method according to claim 2, further comprising a step of determining, in dependence on the quantity of data to be transmitted, the number of the first frequency bands that are combined to form respectively one of the second frequency bands.

5. The method according to claim 1, wherein step c) further comprises:
    c1) switching to the first operating mode if the quantity of the data to be transmitted exceeds a first threshold value, and
    c2) switching to the second operating mode if the quantity of the data to be transmitted falls below a second threshold value which is less than or equal to the first threshold value.

6. The method according to claim 1, step a) further comprises transmitting the data in the first operating mode on the plurality of first frequency bands by modulating the data on the first frequency bands and performing an inverse Fourier transformation.

7. The method according to claim 6, wherein step a) further comprises modulating the data using discrete multitone modulation.

8. The method according to claim 1, wherein step b) further comprises transmitting the data repeatedly in the second operating mode.

9. The method according to claim 8, wherein the number of the second frequency bands is less, by a factor N, than the number of the first frequency bands, and
wherein step b) further comprises transmitting the data N times in the second operating mode.

10. The method according to claim 8, wherein step b) further comprises modulating the data on the second frequency bands and performing an inverse Fourier transformation, and transmitting the result of the inverse Fourier transformation repeatedly.

11. The method according to claim 10, further comprising:
receiving the transmitted data;
performing an assigned Fourier transformation with only one repetition of the repeatedly transmitted data.

12. The method according to claim 8, further comprising:
reducing a transmission power of the repeatedly transmitted data;
receiving the repeatedly transmitted data; and
generating a mean value of the repeatedly transmitted data.

13. The method according to claim 8, wherein step b) further comprises transmitting the data repeatedly in the second operating mode according to the VDSL Standard, repetitive portions of the repeatedly transmitted data being combined with a common prefix and a common suffix.

14. The method according to claim 1, wherein step a) further comprises transmitting the data according to the VDSL Standard.

15. The method according to claim 1, wherein step c) further comprises switching between the first operating mode and the second operating mode in dependence on a quantity of data to be transmitted, the first operating mode used in the case of a greater quantity of data to be transmitted, and the second operating mode used in the case of a lesser quantity of data to be transmitted.

16. The method according to claim 1, wherein the first operating mode and the second operating mode employ the same data transmission standard.

17. The method according to claim 1, wherein switching between the first operating mode and the second operating mode based on a level of power consumption of devices used to transmit and receive the data for the first and the second locations.

18. An apparatus for the transmission of data between a first location and a second location, the apparatus comprising:
a digital transmitter circuit operable to generate a data transmission signal in a first operating mode in a plurality of first frequency bands, the plurality of first frequency bands including first downstream frequency bands for transmitting data from the first location to the second location and first upstream frequency bands for transmitting data from the second location to the first location, and further operable to generate a data transmission signal in a second operating mode in a plurality of second frequency bands, the plurality of second frequency bands including second downstream frequency bands for use by the first digital transmitter circuit and second upstream frequency bands for use by the second digital transmitter circuit
wherein a total number of the first frequency bands is greater than a total number of the second frequency bands, and
wherein the digital transmitter circuit switches between the first operating mode and the second operating mode in dependence on a quantity of data to be transmitted;
an analog transmitter circuit operable to convert the data transmission signal to an analog transmission signal.

19. The apparatus according to claim 18, wherein the digital transmitter circuit is further operable to combine a number of the first frequency bands to form the second frequency bands.

20. The apparatus according to claim 19, wherein in the second operating mode, the digital transmitter circuit is operable generate a data transmission signal in a second operating mode in a plurality of second frequency bands alternately in one of the corresponding first frequency bands.

21. The apparatus according to claim 19, wherein the number of the first frequency bands that are combined to form respectively one of the second frequency bands is determined in dependence on the quantity of data to be transmitted.

22. The apparatus according to claim 18, wherein switchover to the first operating mode is effected if the quantity of the data to be transmitted exceeds a first threshold value, and switchover to the second operating mode is effected if the quantity of the data to be transmitted falls below a second threshold value which is less than or equal to the first threshold value.

23. The apparatus according to claim 18, wherein the digital transmitter circuit further comprises:
a framing device operable to modulate the data to be transmitted on the first frequency bands and the second frequency bands;
an inverse Fourier transformation device operable to convert the modulated data into a chronological sequence.

24. The apparatus according to claim 23, wherein the framing device is further operable to modulate the data using discrete multitone modulation.

25. The apparatus according to claim 18, digital transmitter circuit is further operable to generate the data transmission signal such that the data transmission signal comprises repetitive occurrences of the data in the second operating mode.

26. The apparatus according to claim 25, wherein the number of the second frequency bands is less, by a factor N, than the number of the first frequency bands, and
wherein in the second operating mode, the data transmission signal includes N repetitive occurrences of the data.

27. The apparatus according to claim 25, wherein the digital transmitter circuit further comprises:
a framing device operable to modulate the data to be transmitted on the first frequency bands and the second frequency bands;
an inverse Fourier transformation device operable to convert the modulated data into a chronological sequence, and
wherein the data transmission signal includes repetitive occurrences of a single occurrence of converted modulated data.

28. The apparatus according to claim 25, the analog transmitter circuit is further operable to amplify the data transmission signal with less power in the second operating mode than in the first operating power.

29. The apparatus according to claim 25, wherein the digital transmitter circuit is further operable to generate the data transmission signal such that the data transmission signal comprises repetitive occurrences of the data combined with a prefix and a suffix.

30. The apparatus according to claim 18, wherein the digital transmitter circuit and the analog transmitter circuit cooperate to generate the analog transmission signal in accordance with the VDSL Standard.

31. Apparatus according to claim 18, wherein the digital transmitter circuit operates in the first operating mode in the case of a greater quantity of data to be transmitted, and the digital transmitter circuit operates in the second operating mode in the case of a lesser quantity of data to be transmitted.

32. The apparatus according to claim 18, wherein the first operating mode and the second operating mode employ the same data transmission standard.

33. The apparatus according to claim 18, wherein the digital transmitter circuit is switched between the first operating mode and the second operating mode based on power consumption used to transmit and receive data for the first and the second locations.

* * * * *